United States Patent
Timmermans (10) Patent No.: US 9,767,207 B1
(45) Date of Patent: Sep. 19, 2017

(54) ADAPTIVE USER INTERFACE FOR DIRECTORIES

(71) Applicant: Amazon Technologies, Inc., Seattle, WA (US)

(72) Inventor: Ivo Roald Timmermans, Zuid-Holl (NL)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 14/617,883

(22) Filed: Feb. 9, 2015

(51) Int. Cl.
*G06F 17/30* (2006.01)
*G06F 7/36* (2006.01)

(52) U.S. Cl.
CPC .......... *G06F 17/30867* (2013.01); *G06F 7/36* (2013.01); *G06F 17/3053* (2013.01); *G06F 17/30321* (2013.01)

(58) Field of Classification Search
CPC ......... G06F 17/30053; G06F 17/30713; G06F 17/30; G06F 17/30867; G06F 17/3053; G06F 17/30321
USPC ................................................ 707/600–899
See application file for complete search history.

(56) References Cited

U.S. PATENT DOCUMENTS

| | | |
|---|---|---|
| 4,899,377 A | 2/1990 | Bauer et al. |
| 8,799,806 B2 | 8/2014 | Stallings et al. |
| 2010/0306185 A1* | 12/2010 | Smith .................. G06Q 10/107 707/709 |

* cited by examiner

*Primary Examiner* — Isaac M Woo
(74) *Attorney, Agent, or Firm* — Lee & Hayes, PLLC (57) ABSTRACT

Systems and techniques are utilized to cluster data entries. The data entries may be part of a hierarchical organization or may be categorized based on a set of attributes (e.g., directory of contacts, catalog of multimedia files, digital books). A disclosed method comprises accessing one or more data entries and determining a number of groupings to identify. Individual ones of the data entries are assigned weights. Ranges for individual groupings are determined and the one or more data entries are placed in a grouping based on the assigned weights. The individual groups are presented to a user for selection, where the individual groups are represented by indicia. The groupings may change dynamically based on a change in the one or more of data entries, the display space, a user defined parameter, and/or other factors. A table corresponding to the data entries may be used to determine ranges for the groupings.

20 Claims, 8 Drawing Sheets

ADAPTIVE USER INTERFACE FOR DIRECTORIES

BACKGROUND

Various programs utilize and store large quantities of data or information. Often these programs provide user interfaces that include indicia/controls that enable users to quickly access information. These indicia/controls are often hard-coded and therefore remain the same for all users and for all arrangements of data or information. In the case of a directory of contacts, for example, data related to the contacts may be arranged alphabetically under predetermined groupings of letters, which are often evenly spaced such as "A-C", "D-F", "G-I" . . . and so forth. Since this grouping is predetermined, the underlining data may not be evenly distributed across the groupings (e.g., for some users, there may be no contacts in the grouping of "G-I" and a large number of contacts in the grouping of "A-C").

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components of features.

DETAILED DESCRIPTION

Described herein are techniques and systems for grouping a plurality of data entries so the entries may be dynamically grouped to accommodate various presentation parameters as well as user preferences. Any set of data entries that may be categorized or that have any type of hierarchical ordering to it may benefit from the techniques and systems disclosed herein. Generally, the techniques and systems allow for grouping (i.e., organizing, clustering) data entries such that the quantity of data entries in each group is relatively even or relatively balanced.

According to aspects described herein, a system running the clustering techniques and systems disclosed herein determines groupings for a plurality of data entries. For example, the data entries may be part of a user's electronic directory. As another example, the data entries may comprise digital books that are part of a digital library or contacts in a company organized in a hierarchical order. The entries may be dynamically regrouped at various times and/or in response to various events. In some instances, the data entries may be regrouped in response to resizing of a user interface (e.g., a window) displaying the groups, changing of a number of the groups, changes in the data entries (e.g., additions, deletions, filtered sets), a user selection, and/or in response to other triggering events. In some embodiments, the groupings may be dynamically determined each time the user accesses a program or user interface. Accordingly, by running the techniques and systems disclosed herein, a user device may display data that may be dynamically regrouped.

The techniques and systems disclosed herein may execute quickly on a user device. In several implementations, the systems and techniques disclosed herein may execute even faster by utilizing the map corresponding to the plurality of data entries instead of the entirety of the plurality of data entries. In addition, in various implementations, the data entries may be stored remotely from the location at which the clustering methods might reside and run. For example, the data entries may comprise contacts stored on servers providing a cloud based email service. The servers may send a full contacts list as well as information pertaining to running the techniques and system disclosed herein, to a client device. For example, in some implementations, in addition to sending the full contacts list the server may transfer the map of the contacts to a client device. The client device may run modules implementing the clustering methods disclosed herein to determine appropriate groups for the contacts using the received map instead of using the full contacts list.

In several cases, the systems and techniques disclosed herein may determine how the plurality of data entries may be grouped based on a determination that a certain number of groups may be formed. For example, if a device implementing the techniques for grouping a plurality of data entries determines that 10 groups may be formed, it may group the data entries in a different way than if the device determines that 1000 groups may be formed. The number of groups used may change based on the amount of data, the display space, a user defined parameter, and/or other factors.

Figure 1:
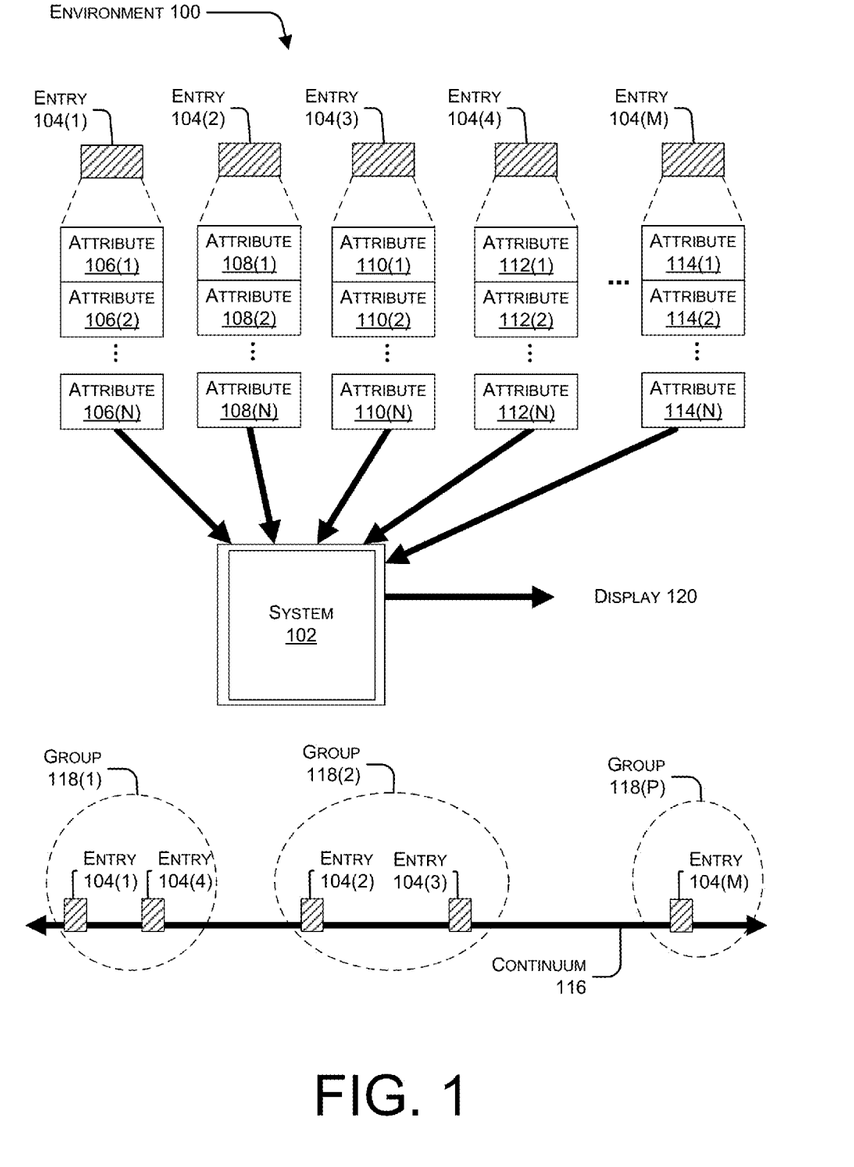
FIG. 1 is a schematic diagram of an example system for grouping entries based on a relationship of each entry's attributes.

FIG. 1 illustrates an environment 100 in which system 102 may be used to group different entries. The environment 100 includes a plurality of entries 104(1), 104(2), 104(3), 104(4), . . . , 104(M). Although 5 entries are shown for discussion purposes, environment 100 may include more or fewer than 5 entries. In some cases, an entry, such as entry 104(1) may represent an individual, a business entity, or other entities that may have contact information or other forms of information associated with it. In other implementations, entries 104 may represent catalogs of music, videos and other media/multi-media files, patent documents, or other content that may benefit from being categorized where each category is represented to a user via indicia or controls.

Each entry, such as entry 104(1) may include a number of attributes, such as attributes 106(1), 106(2), . . . , 106(N). Similarly, entry 104(2) is associated with attributes 108(1), 108(2), . . . , 108(N), and so forth. These attributes may associate a name, address, number, or other information associated with a respective entry. For example, the content may include digital works such as books stored on an electronic book reader device where the digital works may benefit from being categorized based on the title or author of each book. In this example, one digital work may be an entry, such as entry 104(1) and the title of the digital work and the author of the digital work may each be an attribute, such as attributes 106(1) and 106(2), associated with the entry 104(1).

In various implementations, the system 102 and entries 104 may be stored on a user device. In such implementations, the user device may access the entries 104 locally when running the system 102. In other implementations, the entries 104 may be stored on servers that are in communication with a device comprising system 102. In such implementations, the server comprising the entries 104 may exchange data with the device comprising system 102 via a wired network and/or wireless network. In the case of wireless networks, the device comprising system 102 may utilize such wireless networks as a wide area network (e.g., cellular network) or a local area network (e.g., a Wi-Fi network), or the like.

The system 102 may comprise, or be part of, any number of computing or electronic devices, such as a mobile phone, computer, laptop computer, tablet, a reader device, a navigation system, a media playing device, a portable gaming device, a netbook computing device, a wearable computing device (e.g., watch, glasses), and so on. The system 102 can include a number of components, such as one or more processors, memory, and one or more interfaces, such as communication interfaces, display interfaces and the like. The system 102 can also include one or more input/output devices, such as a keyboard, a touch screen display, a microphone, and so forth. The system 102 can also include capabilities for communicating with other servers, and other devices via a wireless or wired network. In the case where the system 102 is in communication with servers that provide remote services, the system 102 may not require end-user knowledge of the physical location and configuration of the servers that deliver the services.

System 102 may utilize the attributes 106-114 corresponding to each of the entries 104(1)-(M), and apply a clustering technique to group the entries 104(1)-(M) based on a number of groups used and in a manner such that each determined group contains an entry. One such clustering technique may apply a weighting scheme to one or more attribute(s) of each entry to emphasize a characteristic of the attribute(s). The clustering technique may group entries 104(1)-(M) based on an analysis of the weight applied to the attribute(s). In various embodiments, the clustering technique may embody a method of dividing a large set of data points into clusters of data points by analyzing a distance metric between each data point, and clustering the data points into groups such that the distance between each data point in a given group is minimized. For example, one clustering technique may embody a k-means clustering algorithm applied to a one-dimensional data structure.

Taking a directory of contacts as an example, where attributes 106(1), 108(1), . . . , 108(M) represent names of the contacts, the clustering technique may first assign numeric values to each name in the directory. Initially, the names may be sorted alphabetically and the clustering technique may weight each name by assigning each name a numeric value that increases based on an entry's alphabetical position. For example, a name starting with "A" may be assigned a smaller numeric value, a name starting with "B" would be assigned a slightly larger numeric value, while a name starting with "Z" would have a much larger numeric value than the value assigned to the name starting with "A." A distance metric in this example may be assessed or calculated by analyzing the numeric difference between the numeric values assigned to each name. According to an analysis based on the distance metric, the name starting with "A" would be deemed closer to the name starting with "B" and much farther away from the name starting with "Z." In this example, the distance metric is based on the numerical difference between the numeric values assigned to each name; however, other distance metrics may be used.

In several implementations, system 102 may apply the clustering techniques as mentioned above, where system 102 assigns a value to each of the attributes 106(1), 108(1), 110(1), 112(1), and 114(1). As depicted on continuum 116 in FIG. 1, system 102 may assign values to each of the entries 104(1)-(M) such that the entries 104(1)-(M) as spaced apart as shown. As shown on continuum 116, based on the values assigned to each attribute, some entries will be closer to others and farther away from others. The system 102 may then analyze the spacing of the entries and cluster the entries depending on how close entries are to each other.

In various embodiments, the clustering techniques applied by system 102 may result in a relatively even distribution of entries per group. That is, the clustering techniques will avoid identifying one group with zero entries and another group with 50 entries. This might occur in the case where indicia labels are fixed. For example, in a scenario where tabs are inflexible or hardcoded to display names starting with "A-M," and "N-Z," if the directory comprises 2 "A" names and 50 "M" names, this would result in all contacts showing up under the "A-M" label with no contacts contained in the "N-Z" label. The clustering techniques discloses herein, may cluster the contents of the directory in a manner such that the distribution of the contents is less lopsided. That is, the clustering techniques may cluster the contents of the directory such that the difference between the number of entries in each group is minimized or such that the difference between the number of entries in any two groups is within a certain minimum amount.

Applying the example discussed above to FIG. 1, where the attributes 106(1), 108(1), 110(1), 112(1), and 114(1) represent names for each entry 104(1)-(M), the system 102 may retrieve the entries 104 and assign a value to each attribute 106(1), 108(1), 110(1), 112(1), and 114(1) based on an alphabetical order of the attributes. As discussed previously, the entries 104 may reside locally on the device comprising system 102. In other implementations, entries 104 may be transmitted to the device comprising system 102 from a remote location. Continuing the example, a name beginning with the letter "A" may be assigned a value of 0. "B" may be assigned a value of "1," "C" may be assigned a value of "2," and so on.

Assuming the alphabetical order of the name attributes are 106(1), 112(1), 108(1), 110(1), and 114(1), as depicted on continuum 116, this may place the entries 104 in a manner depicted in FIG. 1 where entry 104(1) appears first, then entry 104(4), 104(2), 104(3), and finally 104(M). As depicted, entry 104(1) and entry 104(4) appear closer together on the continuum than entry 104(2) and entry 104(3). This might occur for example, if entry 104(1) has a name starting with "A," entry 104(4) has a name starting with "B," entry 104(2) has a name starting with "H," entry 104(3) has a name starting with "L," and entry 104(M) has a name starting with "W." By implementing the clustering techniques disclosed herein, the system 102 is capable of finding the cluster of entries. Accordingly, the clustering technique may identify that entries 104(1) and 104(4) may be grouped together based on the relative close distance between the entries 104(1) and 104(4) and so forth. Accordingly, the system 102 may assign entry 104(1) and 104(4) to group 118(1), entry 104(2) and 104(3) may be assigned to group 118(2) based on a relative close distance to each other and entry 104(M) may be assigned to group 118(P).

Although the previous portion discussed many features of the disclosure in the context of an address book, it is also more generally applicable to other situations where the information is organized according to a hierarchy. For example, the data entries may relate to information associated with different groups organized in a hierarchical structure or tree-like structure (e.g., employee information in a company with several departments and sub-departments). In this example, the cluster methods may assess the number of employees in each level as a way of grouping all the employees. Thus, in a company with departments A and B, where department A comprises subdivisions A1 and A2 and department B comprises subdivisions B1 and B2, the clustering techniques may assess the number of employees either at the department level, the subdivision level or both. For example, if a large quantity of employee information exists for department B and a fewer quantity exists for department A. The clustering techniques may determine to group the employee information for department A in one group and determine more than one group for department B. In various instances, the clustering techniques in this case may assess the additional subdivisions in department B. Although the organizational structure may be assessed to determine some of the groupings, other attributes may be used as secondary attributes, such as names, etc., to further define the groupings.

In various embodiments, system 102 may generate data for depicting the entries 104(1)-(M) in their respective groups 118(1)-(P). This data may be rendered on a display 120. The display 120 may include one or more display devices, such as a liquid crystal display, a touch screen display, a display utilizing another type of display technology, or a combination thereof. Additionally, the display may be physically attached to the device comprising system 102 or it may be located on another device that is in communication with system 102.

Although various implementations describe the entries 104 as being stored on the same device that implements system 102, in various other implementations, the entries 104 may be stored in a location separate from the location of system 102. For instance, the entries 104 may be stored on servers that may be part of a service which collects and manages data from various electronic devices. Additionally, these servers may incorporate or have access to one or more databases. The servers may be maintained by a service provider that provides remote services, such as cloud services, which generally refer to a network-accessible platform implemented as a computing infrastructure of processors, storage, software, data access, and so forth that is maintained and accessible via a network, such as the Internet. Common expressions associated with such remote or cloud services include "on-demand computing," "software as a service (SaaS)," "platform computing," "network accessible platform," and so forth.

Figure 2:
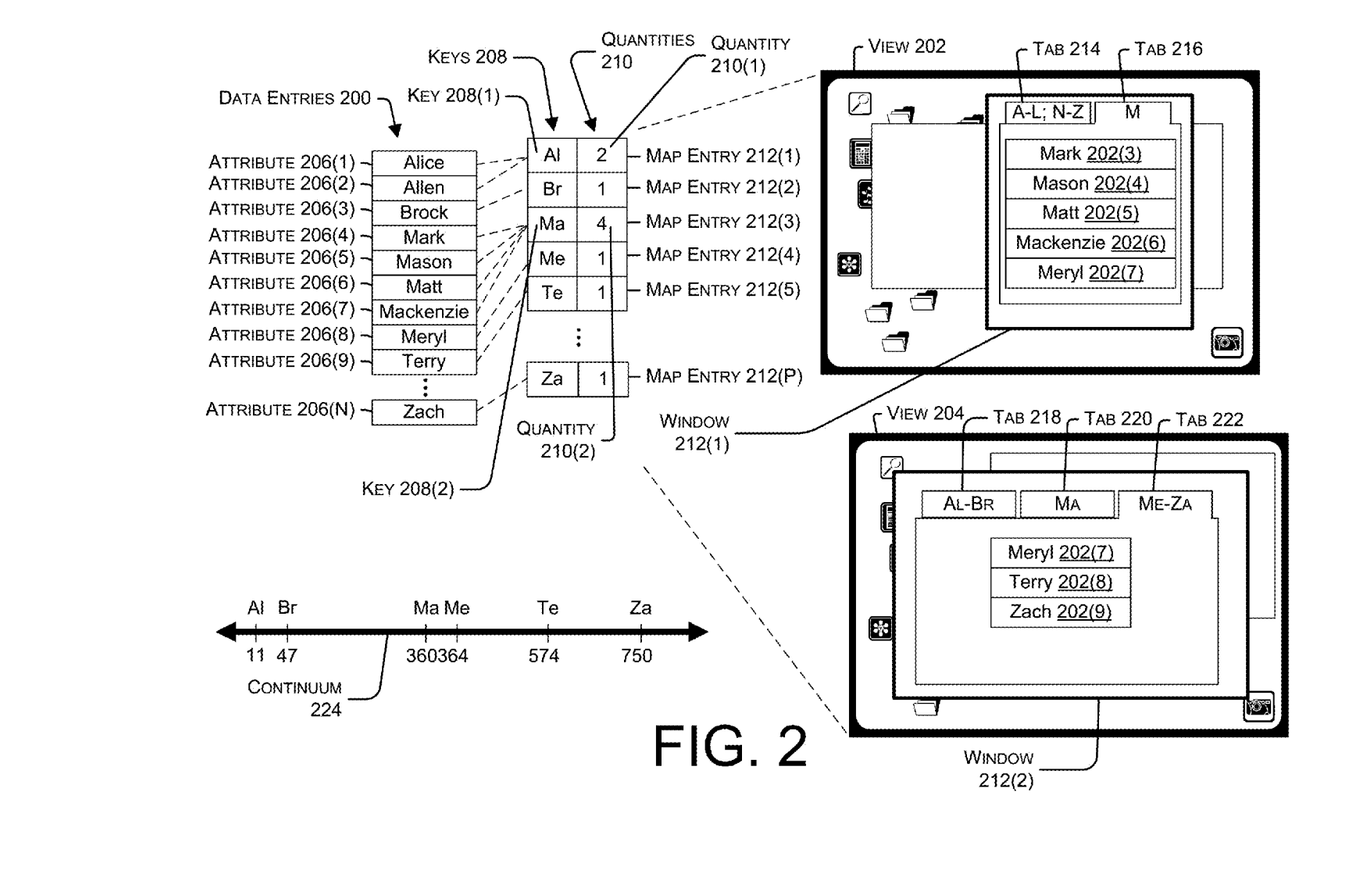
FIG. 2 is a schematic diagram of an example method of grouping entries based on names and exemplary displays associated with the groupings.

FIG. 2 is a schematic diagram of an example environment in which various entries such as the plurality of data entries 200 may be grouped based on the clustering techniques disclosed herein and displayed in a graphical user interface as depicted in views 202 and 204. The data entries 200, as depicted, correspond to contacts stored in a directory. For example, the data entries 200 may comprise contact information stored in a user's device, or an email directory, or telephone directory. Accordingly, as depicted, attributes 206 (1), 206(2), . . . , 206(N) may correspond to names of each of the contacts. Although FIG. 2 depicts entries in a directory, any type of data may be grouped according to the techniques disclosed herein. For example, the data entries 200 may comprise digital works (e.g., books, songs, or other multimedia files), or other content that may benefit from being categorized.

In some implementations, a map (e.g., a table, an index, etc.) may be formed comprising map entries 212(1), 212(2), . . . 212(P). A system may execute faster by using the plurality of map entries 212 instead of using the plurality of data entries 200. The map entries 212(1)-(P) may reflect information about the first two or three characters of an attribute associated with each of the plurality of data entries 200 and a quantity of attributes that have the respective two or three characters. For example, key 208(1) contains the two letters "Al." Key 208(1) is associated with a quantity 210(1) of "2" to reflect the fact that the plurality of data entries 200 contains two data entries with attributes that begin with "Al," attribute 206(1) "Alice" and attribute 206(2) "Allen." Similarly, key 208(2) contains the letters "Ma." This key 208(2) is associated with a quantity 210(2) of "4" because the plurality of data entries 200 contain four attributes that start with "Ma," attribute 206(4) "Mark," attribute 206(5) "Mason," attribute 206(6) "Matt," and attribute 206(7) "Mackenzie." Accordingly, the plurality of keys 208 reflect the first two or three characters contained within each of the plurality of attributes 206. Additionally, each of the plurality of keys 208 may also be associated with a quantity, such as quantity 210(1) and 210(2) that captures the number of entries 200 with attributes 206 that contains the characters identified by each key 208.

In various implementations, a system, such as system 102 may either generate the plurality of map entries 212 or receive the data entries 200 or the keys 208 from a remote location. After clustering the plurality of data entries 200, the system 102 may render the clusters in a manner depicted in windows 212(1) and 212(2). Taking an example where the plurality of data entries 200 are received as inputs, a clustering method may assign a value to an attribute of each of the plurality of data entries 200. As depicted, the attributes 206(1)-(N) correspond to names associated with each of the plurality of data entries 200.

In accordance with the technique for grouping a plurality of data entries 200, the system 102 may assign a value to each of the attributes 206 such that a distance between the attributes 206 is defined. For instance, the clustering technique may assign the following values to the first letter of each attribute 206, which in FIG. 2 are names: A=0; B=1; C=2; D=3; E=4; . . . , Z=25. Accordingly, attributes 206(1) and 206(2) (i.e., "Alice," and "Allen," respectively) are given the value "1." Similarly, attribute 206(3) (i.e., "Brock") is assigned a value "2" and attributes 206(4)-(8) (i.e., "Mark," "Mason," "Matt," "Mackenzie," and "Meryl," respectively) are assigned the value "12." Attribute 206(9) (i.e., "Terry") is assigned a value of "19" and attribute 206(N) (i.e., "Zack") is assigned the value of "25." In this example, the technique for grouping a plurality of data entries or clustering method may then identify groups of values such that the difference or distance between the assigned values is minimized. In one embodiment, the clustering method may identify that the names with values "1" and "2" may be grouped together. The names with the value "12" may be grouped together and the names with the values "19" and "25" may be grouped together.

The clustering method may cluster the values based on a determination that a certain number of groups may be identified. The determination of how many groups may be identified might be a based on an analysis of how many indicia (i.e., tabs or controls) may be displayed in a certain window, a user preference indicated by the user, or other factors provided to the system running the clustering method. For example, as depicted in FIG. 2, the system running the clustering method may identify that only two indicia, such as tab 214 and tab 216 may be displayed in the window 202(1). Although, FIG. 2 depicts indicia in the form of tabs, other navigation controls or elements may be presented that provide an interface in which a user may select a grouping. In response to the selection of a grouping, the user interface may present the data entries corresponding to the selected grouping.

Continuing the current description of FIG. 2, the system running the clustering method may identify two clusters of the plurality of data entries 200. As depicted on tabs 214 and 216, the system running the clustering method may identify that a large number of the plurality of attributes 206 begin with the letter "M" and cluster these attributes in one tab 216. The clustering method may cluster the remaining plurality of data entries 200 in the other tab 214. The clustering method may cluster the names in such a manner based on recognizing that clustering in this manner results in a relatively even distribution of the plurality of data entries 200 amongst the two tabs. By clustering the plurality of data entries 200 in such a manner, a user might have an easier time finding contacts.

Additionally, in some implementations, the user may provide additional data that is used by the clustering method, which is used along with the distance metric to identify the clusters. In these implementations, the user may include the user of the device, an administrator for software provided on the device, a software architect, and various other entities. The user (or admin, etc.) may input the number of groupings or a maximum number of entries in a group. As a result, the clustering techniques may introduce an interactive feature for the user. Thus, a system that implements the techniques and systems for grouping a plurality of data entries may present a user interface that may respond dynamically to changes in the interface, display or user preferences at various times and/or in response to various events. For example, as a user changes the size of a viewing window and thus a number of tabs that may fit within the window, the user may observe changes in the labeling of the indicia, which in turn reflects a change in the makeup of the groups of content occurring in response to a change in the size of the viewing window. Essentially, by dynamically adjusting the groupings in response to various factors, the system 102 may shift and adapt the number of tabs and the underlying groupings within each tab.

As another example, FIG. 2 depicts a case where window 212(1) changes size to window 212(2). In this case, the system 102 may dynamically regroup the plurality of data entries 200 based on a determination that three tabs 218, 220, and 222 may be displayed instead of two tabs 214 and 216. Accordingly, the system 102 may reapply the techniques for grouping a plurality of data entries to determine a new grouping scheme that utilizes the three available tabs as depicted in FIG. 2.

In several embodiments, instead of analyzing the plurality of data entries 200 directly, the system 102 may instead utilize the plurality of map entries 212(1)-(P) comprising the keys 208 and quantities 210. By using the map entries 212(1)-(P) instead of the plurality of data entries 200, system 102 may determine groupings faster. Accordingly, the system 102 may then group the plurality of data entries 200 based on the map entries 212(1)-(P).

Continuing the previous example as applied to window 212(2) with the three tabs 218, 220, and 222, the system 102 implementing the techniques for grouping the plurality of data entries may determine that it can identify three clusters (i.e., for the three tabs 218, 220, and 222). Accordingly, it may assess the map entries 212(1)-(P) to determine that map entries 212(1) and 212(2) may be in a group, map entry 212(3) may be in a group, and map entries 212(4), 212(5), and 212(P) may be in a group. The system 102 may determine these grouping by assigning values to each of the keys 208.

In various implementations, the system 102 may assign a value to each of the plurality of attribute 206(1)-(N) such that a distance between the attributes is emphasized. A second example of how the system 102 might accomplish this follows. The system 102 may multiply the first letter of each of the plurality of attributes 206(1)-(N) by a certain value such as thirty and add the value of the subsequent letter in each of the plurality of attributes 206(1)-(N). For example, assuming the same values apply to letters as described before (i.e., "A"=0, "B"=1, "C"=2, . . . "Z"=25), the keys 208 would be assigned the following values:

"A"=0; "L"=1; "Al"=0×30+11=11
"B"=1; "R"=17; "Br"=1×30+17=47
"M"=12; "A"=0; "Ma"=12×30+0=360
"M"=12; "E"=4; "Me"=12×30+4=364
"T"=19; "E"=4; "Te"=19×30+4=574
"Z"=25; "A"=0; "Za"=25×30+0=750

The values and distance between the keys 208 according to the example above is depicted on continuum 224. Although, this example uses 30 as a multiplier or weighting factor for the first letter, any value may be used to space apart or weight the letter combination. By using 30, in this example, a greater distance is introduced, for example, between "Aa" and "Ba" than if a multiplier of 26 was used. By weighting the letter combinations, the system 102 running the clustering method may easily find the clusters of keys 208 and identify an appropriate number of clusters. As can be seen on continuum 224, by weighting the keys 208, the clusters may be easier to find by the system 102 running the clustering method. That is, by weighting the entries, the distance between groups of entries may be well emphasized or made distinct. If the clusters are well separated, in some embodiments, the clustering method may be able to identify the clusters more easily. That is, the distance between the clusters becomes more pronounced based on the weights applied to the entries. Although this weighting example utilized values in the plurality of map entries 212(1)-(P), this weighting technique may also be applied to the plurality of data entries 200 as well.

In several implementations, the clustering method described herein may identify clusters with entries of comparable spatial extent. For example, the clustering method may identify a cluster of entries by identifying that a group of entries fall within a minimal distance of each other. A distance may be defined by the difference in value between two entries. Thus a distance may be calculated by taking the difference between the two values of the entries. For example, "Ma" and "Me" are separated by a distance of three on the continuum 224. That is, the clustering method may identify that clustering a set of entries is appropriate based on a determination that a distance between any of the given entries within a cluster is equalized or minimized. In other implementations, the clustering method groups the set of entries based on a determination that an average distance between the entries in each group is minimized.

For example, one clustering method may initially randomly select the location of three cluster centers or centroids corresponding to three different clusters. Alternatively, the clustering method may attempt to guess the location of the three cluster centers. For example, given the continuum 224, the clustering method might initially pick the value 50 as a first cluster center, the value 360 as the second cluster center and the value 750 as the third cluster center. In various implementations, the end results of the clusters may very well depend on how the initial cluster centers are chosen.

Next, the clustering method may assess the assigned value of each entry and associate it to the nearest cluster center. Continuing the example depicted on continuum 224, this may result in "Al" and "Br" being associated with first cluster center with a value of 50. Additionally, "Ma" and "Me" may be associated with the second cluster center with the value of 360. And finally, "Te" and "Za" may be associated with the third cluster center with the value of 750. In this example, "Te" might be associated with the third cluster center because the distance between "Te" valued at 574 and "Za" valued at 750 is less than the distance between "Te" and "Me" valued at 364. Thus, the clustering method may identify the three clusters.

In various embodiments, this iteration might be performed multiple times, for example if the predetermined number of clusters required changes. This might occur, for example, with the change of a window size and when the number of tabs that might be displayed within the window changes. As the window size changes the data entries may by dynamically regrouped. As another example, the data entries may be dynamically regrouped when a user accesses a program or user interface such as window 212(1) or 212(2) (i.e., user clicks on a window displaying contact information). Additionally, the clustering method may be run a number of times until an optimal clustering configuration is achieved.

In various embodiments, once the groups are found, they may be represented by some indicia. The indicia may display a representation of the group it represents. As depicted in FIG. 2, the indicia comprise graphical control elements in the form of tabs 218, 220, and 222. These tabs 218, 220, and 222 allow multiple panels to be contained within a window, such as window 212(1). The tab 216 indicates to the user that the panel associated with it contains entries that begin with the letter "M." When a user selects a tab, such as tab 216, the panel associated with that tab 216 is displayed to the user.

Continuing the example from above, when window size 212(1) changes to window size 212(2), the clustering method may receive an indication that three clusters may be identified and dynamically group the directory entries 200 accordingly. For example, the clustering method might cluster the groups in a manner displayed in tabs 218, 220, and 222. In this example, the clustering method might identify that the key 208(2) has four entries and these four entries have a distance of zero between them. Similarly, it may identify that the two "Al" entries have a distance of zero between each other and a distance of 36 between them and the map entry 212(2) with a "Br" key. Additionally, the clustering method may identify that the map entry 212(5) has a distance of 176 between map entry 212(5) and 212(N). As the system 102 applies the techniques for grouping a plurality of data entries, the changes to the indicia labels (e.g., tab labels in the instant description) may be visible to the user. For instance, as a user increases the size of window 212(1) to window 212(2), the user may see the number of tabs shifting from two to three as well as the labels of the tabs changing from "A-L; N-Z" and "M" to "Al-Br," "Ma," and "Me-Za."

By clustering the plurality of entries 200 (i.e., names) in such a manner, a user might have an easier time finding a particular entry (i.e., contact in the directory). For example, in a setting where tabs are hardcoded or fixed, there might be two names under the "A" tab, one name under the "B" tab and five names under the "M" tab, and so forth. In this example where the user has many "M" contacts, the user may find it more useful to be able to choose a tab to find "Ma" names and refer to a different tab to find "Me-Z" names.

In various implementations, as various different multipliers may be used to weight the keys 208 to emphasize a distance between the keys 208, similarly a different number of letter combinations may be analyzed. For example, although FIG. 2 depicts keys utilizing the first two letters of each attribute, three or four letters may be used by the clustering method to determine appropriate grouping schemes. A finer granularity is added with each additional letter that is included in the analysis by the clustering method.

As discussed previously, the plurality of data entries 200 may be stored locally on the device comprising system 102 or located in a remote location such as on servers that provide remote services to the device comprising system 102. In various embodiments, where the plurality of data entries 200 are initially stored in a remote location, the devices at the remote location or servers may determine how many letters are required by the system 102 to execute the techniques for grouping a plurality of data entries and send that information accordingly. Thus, in one example, the servers at the remote location may determine that in order to run effectively, the clustering method requires only the first two letters as inputs. Accordingly, the servers at the remote location may extract the first two letters of each attribute corresponding to each respective data entry and determine the number of entries that contain the respective two letters. The server may then send this information along with the full list of entries to the device implementing the techniques for grouping the plurality of entries, after which the device determines the groupings.

Additionally, by implementing a clustering method that requires only the first few letters to effectively identify clusters, in embodiments where the plurality of data entries 200 are stored in a location different from system 102, the network traffic associated with transmitting a full list of attributes from the servers to the system 102 can be reduced by using just the map entries 212(1)-(P). By using the map entries instead of the full list of the plurality of data entries 200, not only can the network traffic be reduced, but the execution time for the clustering method may also be reduced. That is, the clustering method may be optimized through the use of the map. As the map may contain fewer points that can be assessed by the clustering method, it may run more efficiently. Thus, even in embodiments where the plurality of data entries 200 are located on the system 102, the system 102 may still utilize the map entries 212(1)-(P) to determine groupings.

Figure 3:
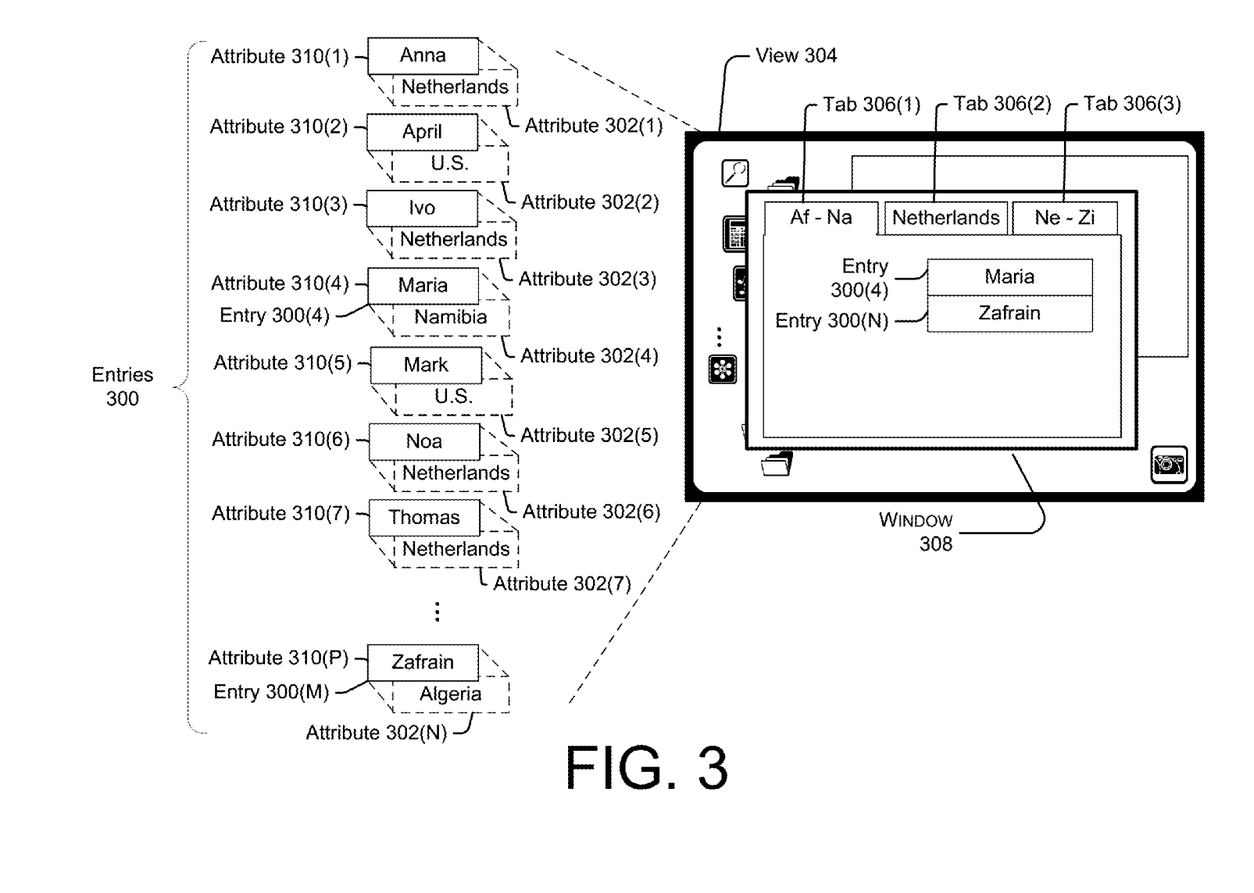
FIG. 3 is a schematic diagram of an example method of grouping entries based on an attribute other than names and an exemplary display associated with the groupings.

FIG. 3 illustrates another schematic diagram of another environment in which various entries such as the plurality of data entries 300, each comprising respective attributes, such as attributes 302(1), 302(2), . . . , 302(N) may be grouped based on a clustering method and displayed in view 304. For the example depicted in FIG. 3, instead of using an attribute reflecting a name of the entry, a different attribute, such as attributes 302(1)-(N), corresponding to the location associated with the entry is used. In various embodiments, this location may represent a workplace location, location of residence, or other locations associated with an entry. In this case, the clustering method executed by system 102 may assign values to each location associated with each entry. Initially, the clustering method may determine that three groups may be identified, based on a determination that optimally, three tabs 306(1), 306(2), and 306(3) may be used given the size of the window 308.

The values may be assigned based on the name of each location. For example, the clustering method may assign a value of thirteen to "Netherlands," based on a clustering method where the attributes are ordered in an alphabetical manner. In various embodiments, this ordering or sorting step may also entail a weighting scheme where the attributes are given a value based on the letter they start with. Similar to an example provided previously, each letter may be assigned a value based on alphabetical order starting with zero. So "A"=0, "B"=1, "C"=2, . . . , and "Z"=25. The clustering method may weight the names based on the first letter or a combination of the first few letters. In the example depicted in FIG. 3, after assigning values to the attributes 302(1)-(N), the clustering method may then determine that many of the entries 300 are associated with Netherlands. The clustering method may then cluster those names associated with the Netherlands and create two additional clusters for countries starting with letters that come before "Ne" and countries starting with letters appearing after "Ne." Accordingly, entries 300(4) and 300(N) are grouped in the first tab, as illustrated in FIG. 3. Although a location attribute has been used in the current example, other attributes associated with each entry may be used to cluster the entries in a manner that is useful for the user.

Grouping the entries in such a manner allows a user to find contacts based on where they are located. In several implementations the number of groupings required may be predetermined and presented to the clustering method as an input defining the number of clusters that may be found. In several implementations, the clustering method may run dynamically and the clustering method may determine the groupings based on entries included in the data set.

The clustering method may execute at any time and for any reason. As discussed previously, in various implementations, the clustering method may run when a window size is changed of when a user accesses a program or user interface. For example, when a window size is reduced, fewer tabs may fit in the window. Accordingly, a system may rerun the clustering method to regroup the entries into a few number of clusters. Similarly, if a window size is increased, a larger number of tabs may be displayed in the window and the clustering method may rerun to accommodate regrouping the data entries into a larger number of groups. Thus the clustering method may present groupings that are presented in an intuitive manner to the user. In several embodiments, the regrouping may be visible to the user, for example, as a user drags a window to a larger size or a smaller size, he may be observe a tab display shifting as the contents represented by the indicia or graphical control elements (e.g., tab) changes. Thus, the regrouping may be an interactive experience for the user as he may observe the groups and labels on each indicia or graphical control elements changing with a change in window size.

For example, in this case depicted in FIG. 3, the user's entries 300 comprise many people associated with the Netherlands and fewer people associated with other parts of the world. Accordingly, the clustering method may determine that grouping the contacts such that the Netherlands are in one group and the rest of the world are in different groups present a more user-friendly graphical user interface than if the tabs were hardcoded to present the entries based on an alphabetical order of locations associated with each entry. In such an instance where the tabs are hardcoded, a user may be presented with an unwieldy or cumbersome graphical user interface that requires a user to scroll through numerous tabs or scroll up and down through many entries under one tab to find what he is looking for.

In another embodiment, the clustering method may determine groups of entries by using several iterations of the clustering method. In yet other embodiments, the clustering method may assess different attributes during different iterations of the clustering. For example, each entry in the plurality of entries 300 is depicted as having at least two attributes, a name attribute 310, and a location attribute 302. In various implementations the clustering method may first group the entries 300 based on the name attributes 310(1), 310(2), . . . , 310(P). After this first iteration, the clustering method may run again on each group to determine subgroups, where the sub-groups are determined based on the location attributes 302(1)-(N). For example, based on the entries 300, the clustering method may first sort and group the name attributes 310(1)-(P) of the entries 300 to determine that at least one group may include the names starting with the letters "A"-"I." Thus, according to the example depicted in FIG. 3, this group may include the entries associated with attributes 310(1)-(3) (i.e., "Anna," "April," and "Ivo"). The clustering method may next run again on this group of names starting with "A"-"I" to determine subgroups based on where the entries are located. Thus, in one example, the clustering method may determine that one subgroup may include "April" who is associated with the U.S. And another subgroup may include both "Anna" and "Ivo" who are both associated with the Netherlands.

Figure 4:
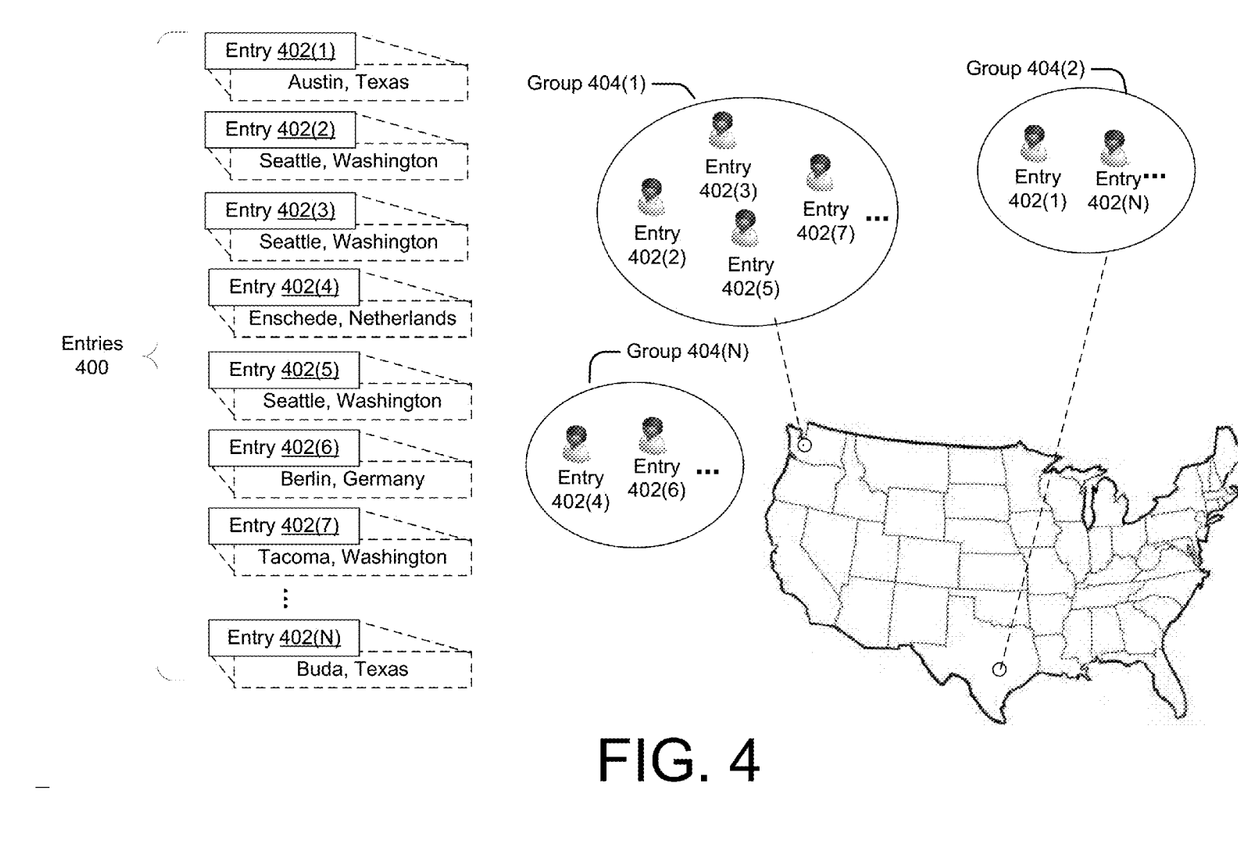
FIG. 4 is a schematic diagram of yet another example method of grouping entries based on an attribute other than names.

To contrast the previous examples, FIG. 4 illustrates a schematic diagram of an environment in which various entries such as the plurality of data entries 400 may be grouped by the system 102 based on a metric different from the distance metric described above. As shown, the data entries 400 have a location associated with each entry. Instead of assigning a value based on the given name of the location, however, the clustering method may use latitude and longitude data of each location and determine a physical distance between locations prior to clustering the entries.

In various implementations, the system 102 may obtain the latitude and longitude information for each location associated with each entry. In one example, instead of assigning a value by which to assess distance by, the clustering method may use the geographical coordinates of each location to determine different parts of the world it might make sense to cluster entries by. In some implementations where the entries are stored at a location remote from the system 102, devices at the remote location may send data related to the geographical location of each location to the system 102. Accordingly, the system 102 may use the geographical locations to determine where certain locations are relative to each other.

For example, as depicted in FIG. 4, four entries 402(2), 403(3), 402(5), and 402(7) are located in the Northwest corner of the United States. Two entries 402(1) and 402(N) are located in the Southern part of the United States, while one other entry 402(4) is location in the Netherlands and one entry 402(6) are located in Germany. The system 102 may determine that a majority of the entries are located in the United States and identify clusters within the United States accordingly. It may identify that few entries are located outside of the United States and it may group all entries associated with locations outside of the United States together. Accordingly, as depicted, the system 104 may group entries 402(2), 402(3), 402(5), and 402(7) into one group 404(1) as they are associated with locations in the northwest part of the United States. Additionally, entries 402(1) and 402(N) may be grouped into group 404(2) as they are associated with locations in the southern part of the United States. Finally, entries 402(2) and 402(6) may be grouped together as group 404(N) because they are associated with locations outside of the United States.

In various implementations, the system 102 may dynamically regroup the entries based on a determination that one or more of the following factors have occurred: a change in the graphical user interface, such as a size of a window, or a view of the window; a user specification to change the groupings; and so on. The system 102 may dynamically regroup the entries without requiring that the makeup of the entries 400 changes (i.e., no addition or deletion of an entry is required). Alternatively, the addition or deletion of an entry from entries 400 may prompt the system 102 to rerun the methods for clustering the entries 400 as disclosed herein. As discussed, however, the addition or deletion of entries is not a necessary condition for prompting the clustering method to run.

Additionally, the system 102 may run the clustering method through several iterations to obtain appropriate groups. For example, the clustering method may initially determine that one cluster may contain entries that are associated with the United States, and a second cluster may contain entries that are associated with locations outside of the United States. The system 102 may apply the process to both clusters through a second iteration of the clustering method to identify appropriate clusters of data within the United States. Thus, the clustering method may identify a cluster of entries that are associated with the Northwestern part of the United States and the Southern part of the United States. After the second iteration, the system 102 may determine that the cluster pertaining to locations outside of the United States may not be further divided, perhaps because a smaller number of contacts are associated with locations outside of the United States.

The clustering method may be able to identify various patterns based on geographical location. For example, aside from clustering entries based on sections of a country the entries are associated with, the algorithm may determine clusters located east of a certain location, and west of a certain location. Thus, the clusters may be determined based on a where they are relative to a predetermined location. For example, in FIG. 4, instead of identifying the clusters as in the Northwest part of the United States, the clustering method may have identified group 404(1) based on the fact that these entries were associated with locations west of Spokane, Wash. The clustering method may be run any number of times to drill down to a certain level of geography. For example, instead of clustering based on a region in a country, the clustering method may run iteratively until clusters are identified within states or even cities.

Figure 5:
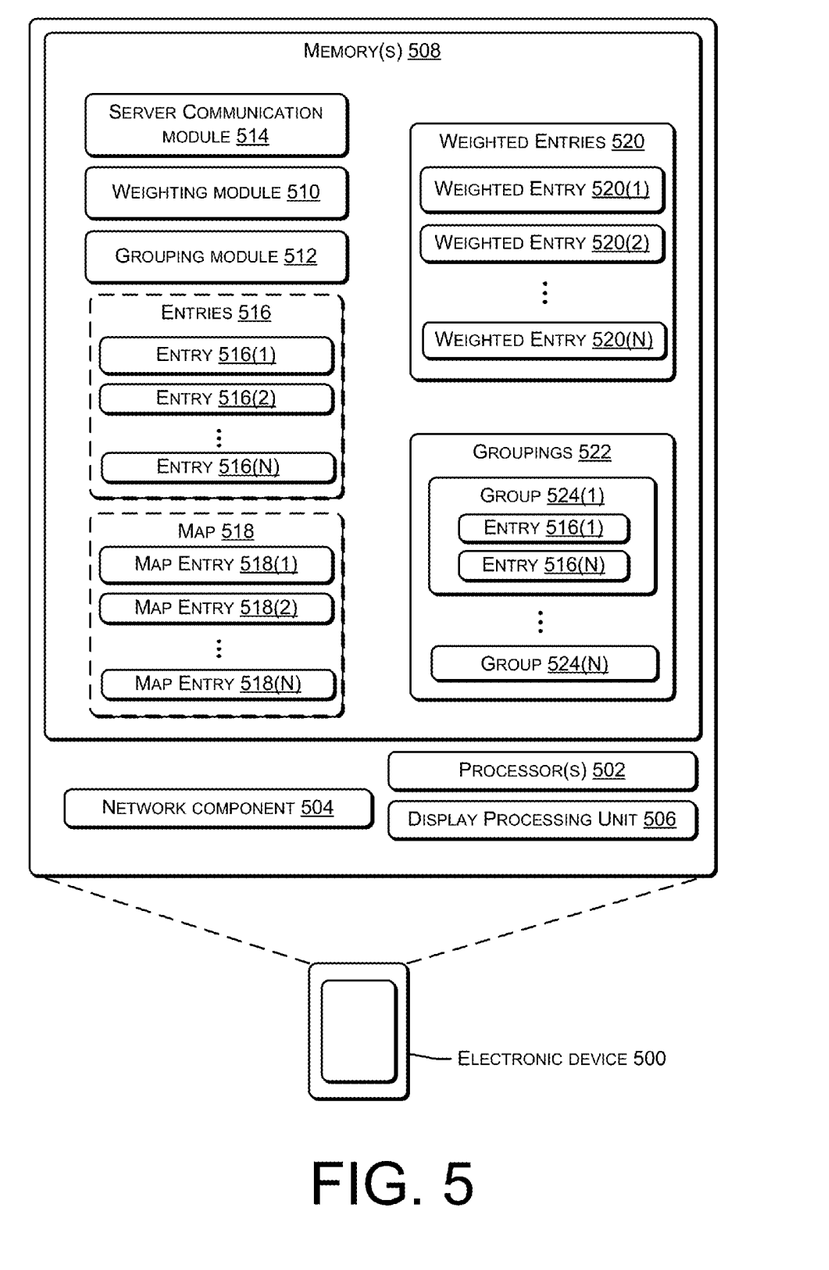
FIG. 5 is a block diagram of an example system that may group entries based on the methods discussed above.

FIG. 5 illustrates a block diagram of an example system such as electronic device 500 that may implement the various embodiments of the clustering methods and techniques as described above to cluster various data entries. The electronic device 500 may include a number of components related to clustering a plurality of data entries and displaying the clusters to a user. The electronic device 500 can also include one or more input/output devices, such as a keyboard, touchscreen, microphone, speakers, and so forth. In several implementations, the electronic device 500 may be a desktop computer, or a mobile device, such as a mobile phone, a tablet, a reader device, a laptop computer, a navigation system, a media playing device, a portable gaming device, a netbook computing device, a wearable computing device (e.g., watch, glasses), and so on.

One of the several components included in the electronic device 500 can include one or more processors, such as the representative processor 502. The processor 502 may include a hardware processing unit, such as a central processing unit, a graphics processing unit, or both. Additionally, the processor 502 may include a local memory that may store program modules, and/or program data. In an illustrative implementation, the processor 502 may include a cache memory and one or more registers as well as digital electronic circuits such as an arithmetic logic unit (ALU) and a control unit. The device 500 may also include input/output devices that may include one or more display devices, such as a liquid crystal display, a touch screen display, a display utilizing another type of display technology, or a combination thereof. The input/output devices may also include a keypad, a keyboard, a pointer device, one or more speakers, combinations thereof, and the like.

The device 500 also includes a network component 504 which implements network connectivity for the device 500. The network component 504 enables the device 500 to communicate with other devices where the communication may be achieved by exchanging discrete data packets or frames over network signal lines such as twisted pair, coaxial, optical fiber, telephone lines, satellites, microwave, relays, modulated AC power lines, infrared wireless, or other conventionally known data transmission systems. In several implementations, the network component 504 enables the device 500 to communication over a wireless network such as a wireless local area network or a wireless wide area network. Additionally, the device 500 includes a display processing unit 506 the may comprise a specialized electronic circuit designed to accelerate the creation of images in a frame buffer intended for output to a display. The display processing unit 506 may process large blocks of data in parallel.

Several implementations of the device 500 may include one or more memory devices, such as memory 508 that may constitute one or more computer-readable storage media. The one or more memory(s) 508 may include volatile and nonvolatile memory and/or removable and non-removable media implemented in any type of technology for storage of information, such as computer-readable instructions, data structure, program modules or other data. Memory 508 may include, but is not limited to, RAM, ROM, EEPROM, flash memory, or other memory technology. Such memory(s) 508 may additionally include one or more hard disks, solid state drives, optical memory (e.g., CD, DVD), network attached storage, storage area networks, cloud storage, removable storage media, any other non-transient memory technologies that may in implemented in a type of tangible computer-readable storage media. In an implementation, at least a portion of the data stored by the memory 508 may be located remotely from the device 500. In some cases, the memory(s) 508 may be accessible by third parties.

The memory(s) 508 may be used to store any number of functional components that are executable by the one or more processor(s) 502. In many implementations, these functional components comprise instructions or programs that are executable by the one or more processor(s) 502 and that, when executed, implement operational logic for performing the operations attributed herein to the electronic device 500. Functional components of the electronic device 500 that may be executed on the one or more processor(s) 502 for implementing the various functions and features related to configuring the electronic device 500 to cluster a plurality of data entries in accordance with the methods disclosed herein include: a weighting module 510 and a grouping module 512.

Additionally, in some embodiments, the plurality of data entries are stored remotely from the electronic device 500. In such embodiments, an additional functional component of the electronic device 500 may include the server communication module 514. In addition to the weighting module 510 and the grouping module 512, the server communication module 514 may also be executed on the one or more processor(s) 502 to implement the various functions and features related to configuring the electronic device 500 to cluster a plurality of data entries in accordance with the methods disclosed herein.

In some cases, the weighting module 510 may assign a value to one or more entries 516(1), 512(2), . . . , 516(N). In several implementations, the entries 516 may comprise individual entries 516(1)-516(N). As discussed previously, one or more entries 516(1)-(N) may be associated with one or more attributes. The value assigned to an entry may be based on an attribute associated with the entry. In an illustrative example, an entry such as 516(1) may represent contact information in a directory. Accordingly, an attribute associated with entry 516(1) may be the name of the contact. Other examples of attributes associated with entry 516(1) may be a number for the contact, home address, email address, workplace address, and so on.

In various embodiments, the device 500 may store a map 518 corresponding the entries 516. As discussed previously, each map entry 518(1), 518(2), . . . , 518(N) comprises a key and quantity. In several implementations, the key may correspond to a given number of letters of an attribute associated with each entry. The key may represent the first two or three letters of each name associated with each entry, for example. The quantity included in a map entry such as map entry 518(1) may reflect the number of entries that comprise an attribute that the key represents. For example, if three different entries are associated with the name "Mary," a map entry 518(1) with a key of "Ma" would also reflect a quantity of three.

In the various embodiments where the device 500 might utilize the map 518, the server communication module 514 may query the servers or devices located at the remote location to obtain the map 518. The server communication module 514 may utilize the network component 504 to contact the devices located at a remote location. Accordingly, the server communication module 514 may communicate via a wireless local area network (e.g., Wi-Fi) or a wireless wide area network (e.g., LTE, WiMAX, or other cellular network technologies). In other implementations, the electronic device 500 may generate the map 518 using data from the entries 516.

Initially, the weighting module 510 may receive an indication that an analysis is to be conducted on either entries 516 or map 518. This indication may be received based on a received request to display the entries 516, a change in size of a screen displaying current entries 516 or a user may have indicated a desire to regroup the entries 516. Accordingly, this received indication may be prompted by reasons other than a change in the makeup of the entries 516. Subsequently, the weighting module may initiate a process of dynamically determining groupings for subsets of a plurality of data entries by assigning a value or weighting the entries 516 or map entries 518(1)-(N). In order to implement the methods disclosed herein, the weighting module 510 may determine the number of letters to include in the weighting scheme. Similarly the weighting module 510 may determine the appropriate multiplier to multiply a given set of letters by, as discussed previously. Overall, the weighting module 510 may weight each entry in such a way that a distance between each of the entries is emphasized.

In various implementations, after applying a weighting scheme to the entries 516 or the map entries 518(1)-(N) the weighting module 510 may store the entries along with their assigned weights as weighted entries 520. In one example, a weighted entry such as weighted entry 520(1) may comprise the original entry, such as entry 516(1) or map entry 518(1) and a value associated with the entry by the weighting module 510.

Subsequently, in some embodiments, the grouping module 512 may assess the weighted entries 520 to determine groupings for the weighted entries 520. The grouping module 512 may implement the methods described herein to determine the groupings. The grouping module 512 may subsequently store the determined groupings 522 as groups 544(1), . . . , 524(N). As shown, each group, such as group 524(1) may reflect which entries are included in the group 524(1). Subsequently, the device 500 may prepare for display, data corresponding to the groups 524(1)-(N) such that the groups may be displayed via the display processing unit 506. As discussed previously, in various embodiments, the groups may be represented by indicia. The indicia may display a characteristic of each group so the user may determine which indicia contains the contact he is searching for.

Figure 6:
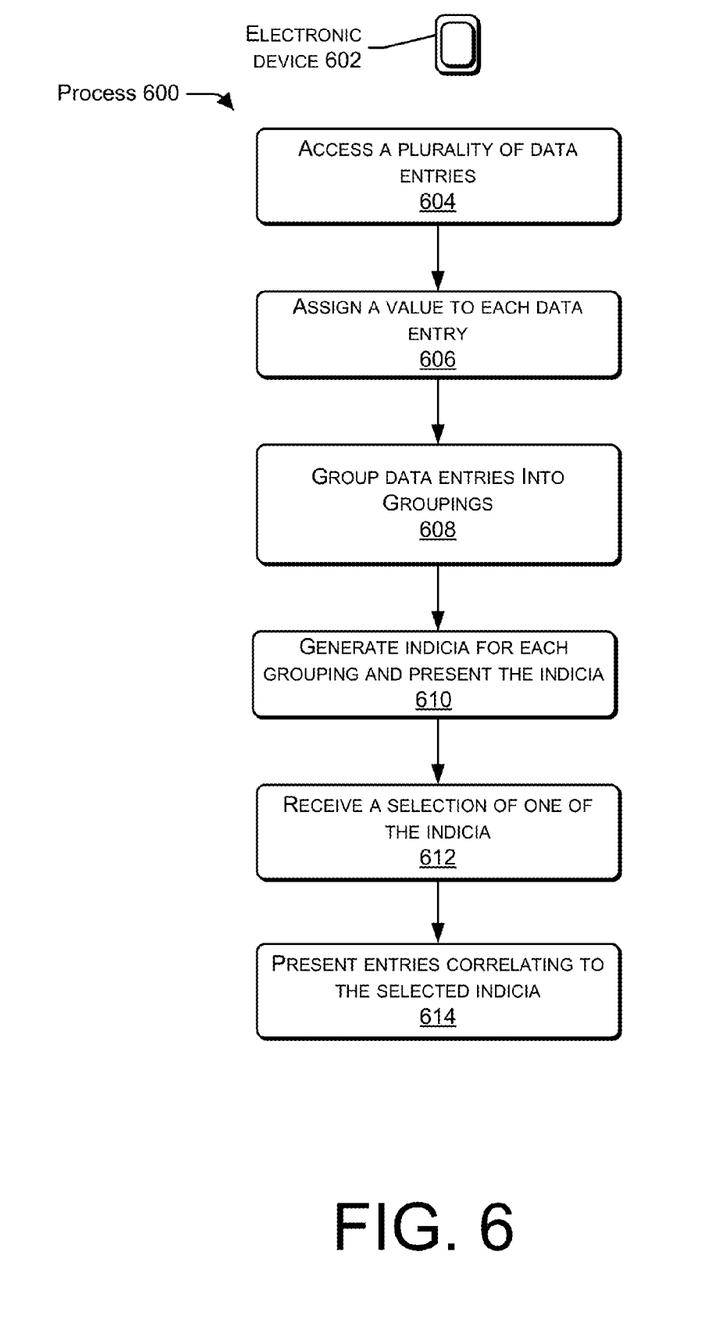
FIG. 6 is a flow diagram of an example process for grouping a plurality of data entries.
Figure 7:
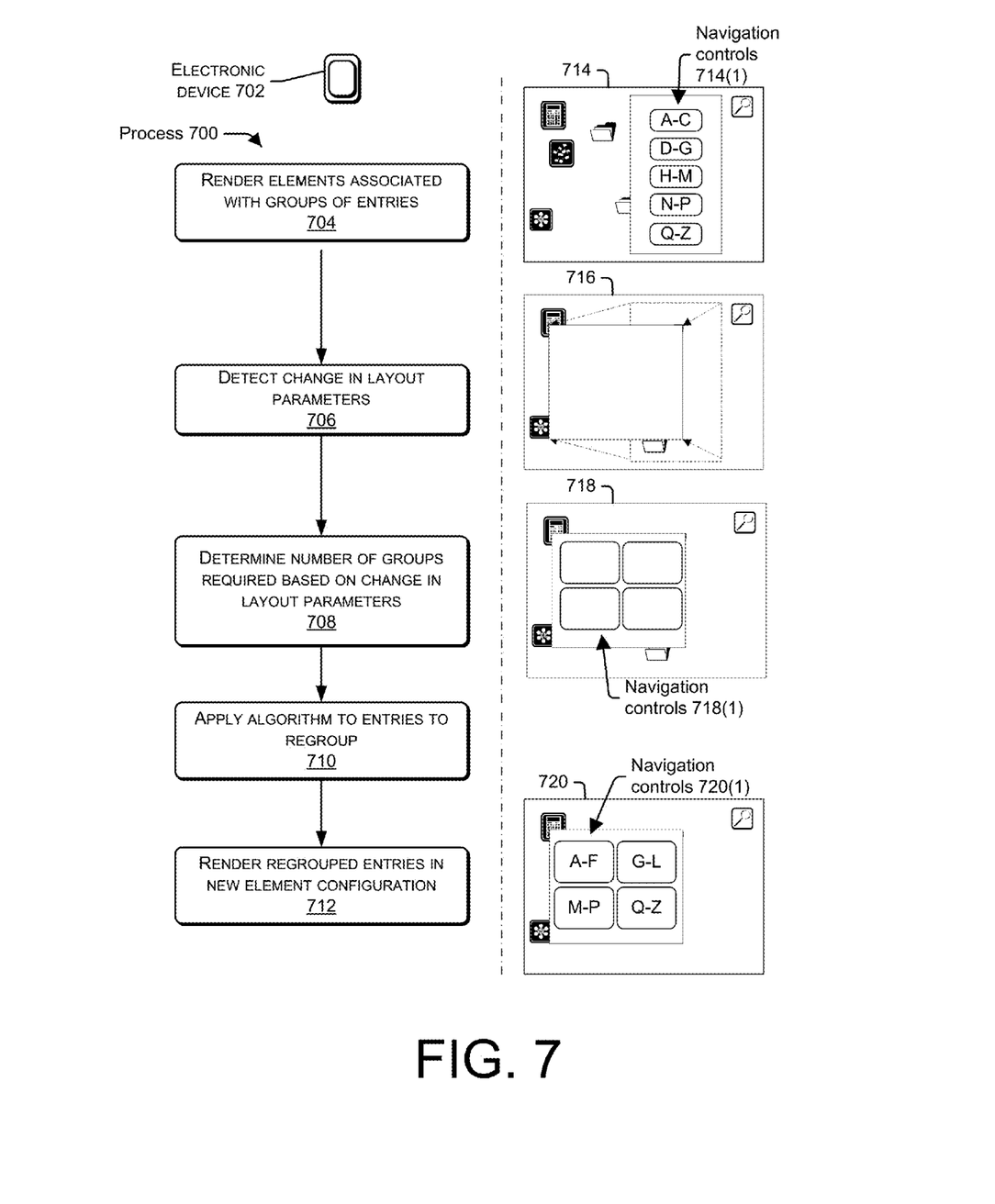
FIG. 7 is a pictorial flow diagram of an example process where the grouping of a plurality of data entries may change dynamically.
Figure 8:
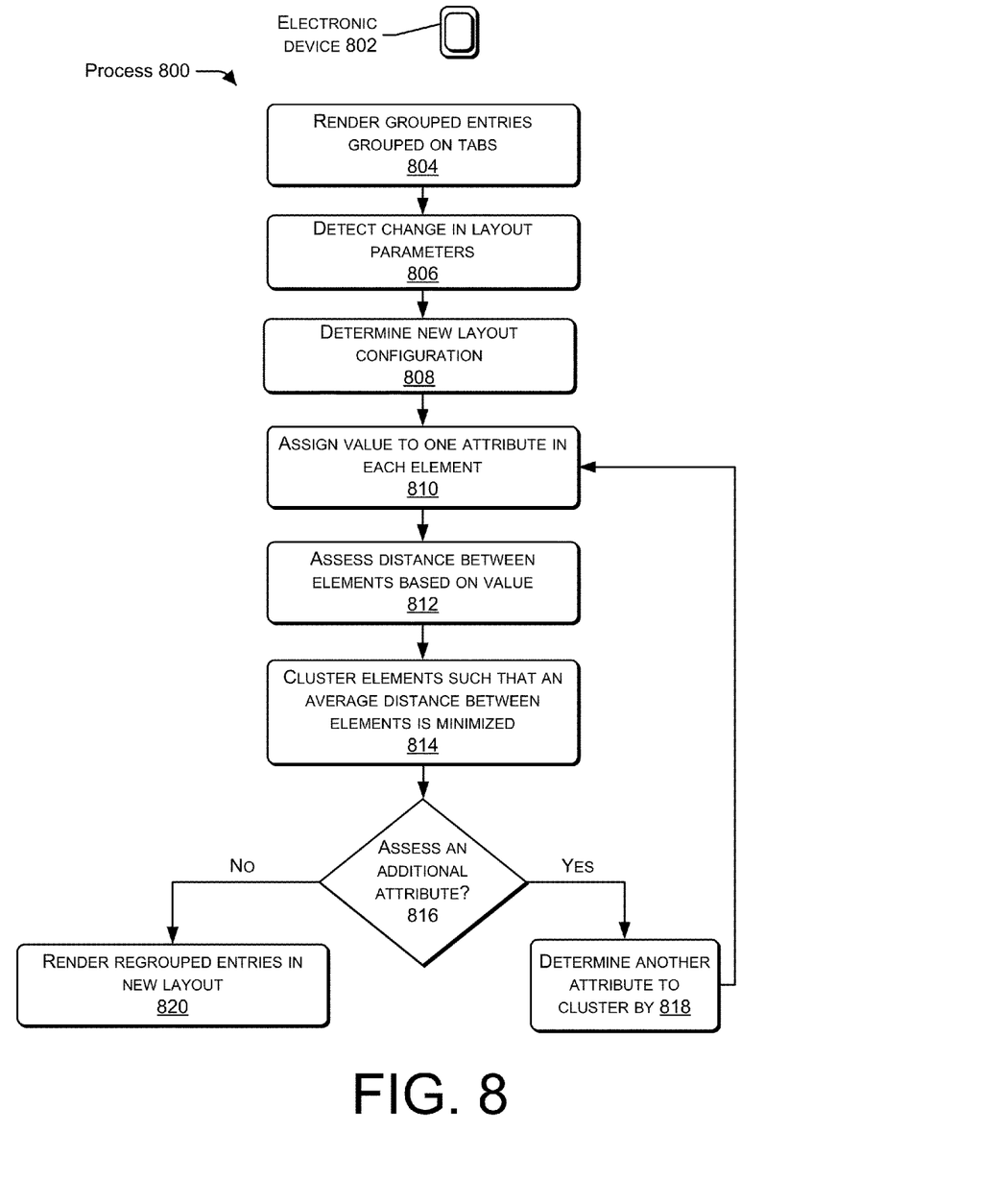
FIG. 8 is a flow diagram of another example process for grouping a plurality of data entries.

FIGS. 6, 7, and 8 are flow diagrams illustrating example processes for clustering data entries by utilizing the clustering methods disclosed herein. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described may not be construed as a limitation. Any number of the described block can be combined in any order and/or in parallel to implement the process, of alternative processes, and not all of the blocks have to be executed. For discussion purposes, the processes herein are described with reference to the frameworks, architectures and environments described in the examples herein, although the processes may be implemented in a wide variety of other frameworks, architectures or environments.

FIG. 6 illustrates a flow diagram of an example process 600 for grouping a plurality of data entries. The process 600 may be performed in part by electronic device 602, which is similar to device 500 as described previously. At 504, an electronic device 602 may access a plurality of data entries. In one embodiment, these data entries may be present on the device. In other embodiments, the data entries may be access from a remote location such as servers that provide a remote service to the electronic device 602. Additionally, in some implementations, the electronic device may access a map associated with the plurality of data entries, where the map comprises keys to the data entries as well as the number of data entries that map to each key. At 606, the electronic device may apply a clustering method to group the entries in a manner that is user-friendly. To begin the process, the electronic device may assign a value to each data entry according to one of the several methods described herein. In some implementations, the clustering method may initially sort the entries, for example it may sort entries alphabetically, prior to assigning a value to the data entries.

At 608, the device 602 may group data entries into groupings such that an average distance between the entries in each group is minimized. In various implementations, this may comprise assessing a difference between the values assigned to each attribute or entry and determining that entries that may be grouped together such that an average distance between any member in a group is minimized. In various implementations, this may also comprise balancing the number of entries amongst the different groups such that the groups contain a relatively even number of entries.

At 610, the device 602 may generate indicia for each grouping and present the indicia in a display. In one implementation, the indicia may be implemented as tabs displaying a representation of each cluster. For example, if the clusters were created from an alphabetical ordering of names, the tabs may display the alphabetical range of the names included in each cluster.

At 612, the electronic device 602 may receive a selection of one or more of the indicia. As discussed previously, each indicia may be associated with each identified cluster. In the implementation where the indicia are implemented as tabs, each tab may be associated with a panel that displays the full list of names included in each cluster once a user selects a tab. At 614, the electronic device 602 may present entries corresponding to the selected indicia. Continuing the current example, one the user selects a tab, the panel associated with the tab may be displayed to the user. The panel may display the full list of names included in the tab.

FIG. 7 illustrates a flow diagram of an example process 700, implemented by an electronic device 702 for grouping a plurality of data entries and dynamically regrouping the data entries due to a detected change in layout parameters. At 704, the electronic device may render elements associated with groups of entries. In various embodiments, the elements may comprise navigation controls that enable a user to select a specific grouping. As discussed previously, navigation controls may include various indicia such as icons, tabs, or other graphical interfaces that allow a user to access data entries. In various implementations, the navigation controls may indicate a range of entry names included in the group represented by the navigation control. In an example 714, navigation controls 714(1) are displayed. A user may select one of these navigation controls to access a corresponding group of data entries.

At 706, the device 702 may detect a change in layout parameters. In various implementations, a change in layout parameters might be caused by a user changing the window size (as depicted in example 716), the placement of another window on top of the window displaying the entries, a change in orientation of the device, and so on. In additional implementations, the change in layout parameters might be due to changes in the data entries, a user defined change in the number of groups, or other triggering events.

At 708, the device 702 may determine the number of groups required based on the change in the layout parameters. For example, the device 702 may determine the number of navigation controls that are available in the new configuration. As shown in example 718, due to a change in the size of the window, a separate arrangement of the navigation controls 718(1) is shown. The number of navigation controls may dictate the number of clusters that may be determined. In the event of a resized user interface (e.g., a window), the number of available navigation controls may define the number of clusters that the clustering method may identify. Additionally, a user input may dictate the number of clusters that may be determined.

At 710, the device 702 may apply the clustering methods and techniques as disclosed herein to regroup the plurality of entries into a predetermined number of groups. As discussed previously, this may entail finding a certain number of clusters. For example, if an x number of navigation controls are available, the clustering method might identify x number of clusters. As discussed previously, At 712, the device 702 may render the regrouped entries in a new element configuration. Example 720 depicts elements such as navigation controls 720(1) in a different configuration where the navigation controls 720(1) comprise different ranges for the data entries.

FIG. 8 illustrates another example process 800, implemented by an electronic device 802, for grouping a plurality of data entries and dynamically grouping the data entries. At 804 the electronic device 802 may render grouped entries grouped on tabs. As At 806, the electronic device 802 may detect a change in layout parameters. As discussed previously, this may entail detecting a change in tab configuration, a change initiated by a user input, a change due to a change in orientation of the device, a change in the view of the data entries, etc.

At 808, the electronic device 802 may determine a new layout configuration. For example, after detecting a change in layout parameters, the device 802 may determine an appropriate number of clusters to identify based on the number of tabs being displayed in the new layout configuration. At 810, the electronic device 802 initiates the process for identifying a new group of clusters. The device 802 may identify an attribute to base the clustering on and assign a value to the identified attribute in each element.

At 812, the electronic device 802 may assess a distance between elements based on the assigned values. As discussed previously, the distance may be determined based on a difference between the values. At 814, the device may cluster elements such that an average distance between the elements in minimized. As discussed previously, in one example, this may entail determining a value for each cluster. This value may act as a reference value. The elements are then assigned to each cluster based on a difference between a value of the element and the reference value for a cluster. The element may be assigned to a cluster where the difference is the smallest.

At 816, the electronic device 802 may decide whether to assess an additional attribute. As discussed previously, the clustering method may be run iteratively on the same set of data to identify subgroups. Additionally, the clustering method may be run iteratively on different attributes.

If the device 802 determines that an additional attribute may be assessed, whether the same attribute or a different one, the process 800 may proceed to 818 where it determine which attribute to cluster based on next. For example, the device 802 may initially assess an attribute corresponding to the locations of various entries. Thus, it may define groups based on the different locations corresponding to the entries. At 816, in this example, the device may then determine that it would like to assess an additional attribute, such as names of the entries. Accordingly, it may further group the entries based on the names corresponding to the entries. After 818, the process proceeds to 810 to perform another iteration of the clustering method. Otherwise, if the device 802 determines that an additional attribute does not have to be assessed, the process 820 may proceed to 820 where the device renders the regrouped entries in the new layout.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   accessing one or more data entries for an address book;
   determining a number of data entry groupings to present in an address book user interface;
   assigning values to individual data entries of the one or more data entries to create one or more weighted data entries;
   determining that a subset of the one or more weighted data entries are within a minimum value of each other;
   determining respective ranges for individual ones of the groupings based on the determined number of groupings and the determining that a subset of the one or more weighted data entries are within the minimum value of each other;
   assigning a subset of the data entries corresponding to the subset of the one or more weighted data entries to a particular grouping of the groupings, the assigning based on a range of the particular grouping;
   presenting with a user interface element for the particular grouping in the user interface;
   receiving a selection of the user interface element for the particular grouping; and
   presenting the data entries of the particular grouping in the user interface.

2. The method of claim 1, further comprising:
   generating a table for the one or more data entries, the table indicating in how many of the data entries a given letter occurs; and
   determining the respective ranges based on the table.

3. The method of claim 1, further comprising:
   determining a change in a number of user interface elements to show for the address book user interface; and
   determining a different number of data entry groupings to create based on the determining the change in the number of user interface elements to show for the address book user interface.

4. The method of claim 1, wherein the determining respective ranges for individual ones of the groupings further comprises:
   determining respective distances between the assigned values of the individual data entries of the one or more data entries.

5. A computer-readable storage medium storing instructions that, when executed, cause one or more processors to perform acts comprising:
   determining a number of groups for organizing one or more data entries, individual data entries of the one or more data entries comprising respective ones of an attribute;
   sorting the one or more data entries based on the respective ones of the attribute of the individual data entries;
   assigning respective weights to the individual data entries based on the respective ones of the attribute;
   determining, based on the respective weights, a first weight range for a first group and a second weight range for a second group;
   associating a first individual data entry of the data entries with the first group, based on the respective weight of the first individual data entry and the first weight range for the first group;
   associating a second individual data entry of the data entries associated with the second group, based on the respective weight of second individual data entry and the second weight range for the second group; and
   displaying, in a user interface, a first label for the first group and a second label for the second group.

6. The computer-readable storage medium of claim 5, wherein the instructions further cause the one or more processors to perform acts comprising:
   determining a different number of groups based on characteristics of a display;
   determining a revised weight range for the first group;
   associating the first individual data entry with the first group, based on the respective weight of the first individual data entry and the revised weight range for the first group.

7. The computer-readable storage medium of claim 5, wherein the first label is displayed on a first table element and the second label is displayed on a second tab element.

8. The computer-readable storage medium of claim 5, wherein the instructions further cause the one or more processors to perform acts comprising:
   receiving a latitude and a longitude for a data entry of the one or more data entries, wherein the sorting is based on the latitude and longitude associated with the data entry.

9. The computer-readable storage medium of claim 5, wherein the instructions further cause the one or more processors to perform acts comprising:
   detecting a change in the user interface displaying the first label for the first group, wherein the change in the user interface causes a change in a total number of labels shown;
   in response to detecting the change, changing a composition of the first group to create an altered first group; and
   rendering an altered first label associated with the altered first group.

10. The computer-readable storage medium of claim 9, wherein the change in composition of the first group is visible to a user.

11. The computer-readable storage medium of claim 5, wherein the sorting the one or more data entries is performed based on a subset of letters comprising individual ones of the one or more data entries.

12. The computer-readable storage medium of claim 5, wherein the instructions further cause the one or more processors to perform acts comprising:
   receiving an indication that a different number of groups have been requested, wherein the first label corresponds to a first subset of the one or more data entries and the second label corresponds to a second subset of the one or more data entries; and
   changing a composition of the first subset of the one or more data entries and a composition of the second subset of the one or more data entries, based on the received indication.

13. The computer-readable storage medium of claim 12, wherein the indication is received based on a user request.

14. The computer-readable storage medium of claim 5, wherein the attribute comprises a name, a title, a geographic location, or an author.

15. A system comprising:
one or more processors; and
a memory coupled to the one or more processors, the memory storing computer-readable instructions that, when executed by the one or more processors, cause the one or more processors to:
   access an index for one or more data entries of an address book, the index comprising a first index entry and a second index entry;
   assign a weight to the first index entry and a weight to the second index entry, the assigning associating a first value with the first index entry and a second value with the second index entry;
   determine a first group including the first index entry based on the first value, and a second group including the second index entry based on the second value;
   associate the first group with a first indicia and the second group with a second indicia; and
   present the first and second indicia for selection in a user interface.

16. The system of claim 15, wherein the instructions further cause the one or more processors to:
   calculate a distance between the first value and the second value based on a difference in value between the first value and the second value; and
   determine the first group and the second group based on the calculated distance.

17. The system of claim 15, wherein the instructions further cause the one or more processors to:
   determine groupings for the one or more data entries by applying a clustering algorithm to the one or more data entries.

18. The system of claim 15, wherein the first indicia displays a first indicia range and the second indicia displays a second indicia range, and wherein the instructions further cause the one or more processors to:
   detect a change in the presentation of the user interface; and
   in response to detecting the change, change the first indicia range to an altered indicia range.

19. The system of claim 15, wherein the instructions further cause the one or more processors to:
   receive the index correlating to the one or more data entries from a location remote from the system.

20. The system of claim 15, wherein the instructions further cause the one or more processors to:
   dynamically determine a different number of groups based on a change in layout parameters.

* * * * *